United States Patent
McTeggart (10) Patent No.: US 11,539,733 B1
(45) Date of Patent: Dec. 27, 2022

(54) IDENTIFYING EPHEMERAL COMPUTING ASSETS USING MACHINE LEARNING

(71) Applicant: Rapid7, Inc., Boston, MA (US)

(72) Inventor: Ralph McTeggart, Belfast (GB)

(73) Assignee: Rapid7, Inc., Boston, MA (US)

( * ) Notice: Subject to any disclaimer, the term of this patent is extended or adjusted under 35 U.S.C. 154(b) by 383 days.

(21) Appl. No.: 16/722,126

(22) Filed: Dec. 20, 2019

(51) Int. Cl.
*H04L 29/06* (2006.01)
*H04L 9/40* (2022.01)
*G06K 9/62* (2022.01)
*G06N 20/00* (2019.01)
*H04L 101/622* (2022.01)

(52) U.S. Cl.
CPC ........ *H04L 63/1433* (2013.01); *G06K 9/6267* (2013.01); *G06N 20/00* (2019.01); *H04L 2101/622* (2022.05)

(58) Field of Classification Search
CPC .. H04L 63/1433; H04L 61/6022; G06N 20/00
See application file for complete search history.

(56) References Cited

U.S. PATENT DOCUMENTS 10,432,669 B1* 10/2019 Badhwar ............. H04L 63/1408
2021/0149986 A1* 5/2021 Hershey ............... G06N 3/0445

* cited by examiner

*Primary Examiner* — Wasika Nipa
(74) *Attorney, Agent, or Firm* — Ashwin Anand (57) ABSTRACT

Disclosed herein are methods, systems, processes, and machine learning models for identifying ephemeral or short lived computing assets in a network. Data indicative of potential ephemeralness associated with the computing assets in the network is received. The received data is processed and provided as input to a logistic machine learning model trainer for classification based on logistic regression. The logistic machine learning model trainer classifies each computing asset as ephemeral or non-ephemeral based on one or more ephemeralness feature characteristics of each of the computing assets that are part of input data. The logistic machine learning model trainer generates a trained logistic machine learning model for identifying new ephemeral computing assets in the network and excluding these new ephemeral computing assets from security operations. The logistic machine learning model is then stored for automatically determining whether a new computing asset in the network is ephemeral.

8 Claims, 7 Drawing Sheets

Security Operation Asset Selection Table 405

| New Asset Field 410 | Hostname Field 415 | IP Address Field 420 | OUI Field 425 | Location Field 430 | Confidence Field 435 | Selection Field 440 |
|---|---|---|---|---|---|---|
| 445(1) | sales.xxx.com | 192.168.1.60 | C8 60 00 | Boston | 50% | Include |
| 445(2) | finance.yyy.co.uk | 195.22.126.136 | 00 A0 33 | Belfast | 90% | Exclude |
| 445(3) | marketing.xxx.com | 192.168.1.46 | C8 60 00 | Boston | 20% | Include |
| 445(4) | engineering.zzz.ca | 216.58.216.164 | 00 21 2F | Toronto | 95% | Exclude |
| ... | ... | ... | ... | ... | ... | ... |

IDENTIFYING EPHEMERAL COMPUTING ASSETS USING MACHINE LEARNING

BACKGROUND

Field of the Disclosure

This disclosure is related to computer asset identification to perform cybersecurity computing operations. In particular, this disclosure is related to identifying ephemeral computing assets using machine learning characteristics.

Description of the Related Art

Modern cybersecurity computing ecosystems rely on asset detection and/or management (e.g., to detect vulnerabilities, respond to security incidents, implement remediation operations, and the like). The scale and complexity of implementing adequate cybersecurity measures in such computing environments is directly correlated to the sheer number of computing assets that are detected and thus have to be subsequently monitored (e.g., for risky or unusual user and/or system behavior that can indicate potential malicious activity, and the like).

In contemporary computing environments, companies and organizations are typically charged by cybersecurity vendors (e.g., vulnerability management vendors, and the like) based on the number of assets that are scanned in their environment (e.g., a given amount per asset detected in a network scan, and the like). Data associated with the scanned (and discovered) assets is then stored for analysis and subsequent action by various cybersecurity sub-systems and operations.

A virtual machine is one example of a computing asset. Virtual machines are ubiquitous in modern computing and networking environments and are used to perform a wide variety of computing tasks. One benefit of virtual machines is that they can be provisioned and de-provisioned relatively quickly (e.g., spun up and shut down in a speedy and efficient manner compared to a physical computing device). Given this fact, virtual machines can tend to be short-lived (or ephemeral). For example, a virtual machine can be spun up to perform a given task and can be taken offline (from the network) within a manner of minutes. Unfortunately, the proclivity of virtual machines to ephemeralness presents a technology-related problem in modern computing environments that implement cybersecurity solutions (e.g., based on scanned assets).

SUMMARY OF THE DISCLOSURE

Disclosed herein are methods, systems, and processes for identifying ephemeral computing assets using machine learning models and characteristics. One such method involves receiving data associated with computing assets in a network and providing the data as an input to a logistic machine learning model trainer. In this example, a logistic machine learning model is trained to classify each computing asset as ephemeral or non-ephemeral based on one or more feature characteristics of (each of) the computing assets. The method then stores the trained logistic machine learning model.

In one embodiment, the trained logistic machine learning model is configured to determine whether a new computing asset in the network that is not part of the plurality of computing assets is ephemeral and generate an ephemeralness confidence score for the new computing asset. In this example, the logistic machine learning model trainer utilizes logistic regression as a binary classification methodology for the training. In another embodiment, the feature characteristics include a hostname, an Internet Protocol (IP) address, a Media Access Control (MAC) address, and location information of each of the computing assets.

In some embodiments, the data provided as the input to the logistic machine learning model includes an organizational unique identifier (OUI) of the MAC address instead of the MAC address for the computing assets. In other embodiments, the computing assets include physical computing assets and virtual computing assets and execute in one or more networks, and the data is collected by an agent executing on each of the computing assets. In certain embodiments, the new computing asset is excluded from security operations by an agent manager that manages the agent executing the plurality of computing assets, and the security operations include a vulnerability assessment operation, a vulnerability management operation, a vulnerability validation operation, or a penetration testing operation.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects and features made apparent to those skilled in the art by referencing the accompanying drawings.

The disclosure is susceptible to modifications and alternative forms and specific embodiments of the disclosure are provided as examples. The drawings and detailed description are not intended to limit the disclosure to the form disclosed and cover modifications, equivalents and alternatives falling within the spirit and scope of the disclosure as defined by the claims.

DETAILED DESCRIPTION

Introduction

Disclosed herein are methods, systems, and processes to automatically identify ephemeral computing assets. When computing assets (e.g., physical computing assets like desktops and laptops or virtual computing assets like virtual machines) are connected to a network (e.g., a corporate Local Area Network (LAN) or Wide Area Network (WAN)), confidently predicting whether a given computing asset will stay (or remain) a part of that given network (e.g., beyond a minimum threshold of time (e.g., 5 minutes, 10 minutes, etc.)) presents a technology-related challenge in cybersecurity computing environments.

For example, a user might start up a virtual machine and shut down the same virtual machine again in a matter of minutes (e.g., 2 minutes) for the virtual machine to be never seen again by asset management and/or asset detection software/system. However, as far as the asset management/detection system is concerned, the given virtual machine still exists. Given that companies often deploy a significant number of virtual machines (e.g., in cloud environments) that are only intended to be short lived (or ephemeral), there is currently no methodology that can automatically (or confidently) detect whether a given computing asset on a network is intended to be short lived (e.g., without having the user identify the asset as such, manually).

In cybersecurity computing environments, short lived or ephemeral computing assets pose a technological problem with respect to optimizing the performance of security operations such as asset scanning, discovery, vulnerability management, and the like. In such environments, computers and other assets are identified and discovered by various systems (e.g., scan agents, network scanners, and the like), and their data is retained despite such assets not existing for long (e.g., less than a minute in some cases). The foregoing results in significant financial and computing cost not only to store such data (e.g., in storage), but also results in sub-optimal utilization of expensive cybersecurity computing resources because there is no easy method to filter out computing assets that either did not or will not stay active for long (e.g., on a network). Therefore, currently, the existence of a computing asset of a network (whether or not short lived) not only presents financial and computing costs (e.g., in terms of expensive storage resources), but also makes it difficult to confidently ration expensive cybersecurity computing resources.

For example, confidently excluding such short lived or ephemeral assets from subsequent (or continued) monitoring, vulnerability management, penetration testing, or other types of cybersecurity operations (some of which can be charged based on a price per asset model by security vendors) can be extremely beneficial to resource-stretched corporate information technology (IT) departments. Disclosed herein are methods, systems, and processes to automatically identify ephemeral computing assets to exclude them from security operations based on one or more machine learning techniques and/or methodologies.

Example Agent Management Server to Identify Ephemeral Assets

Figure 1:
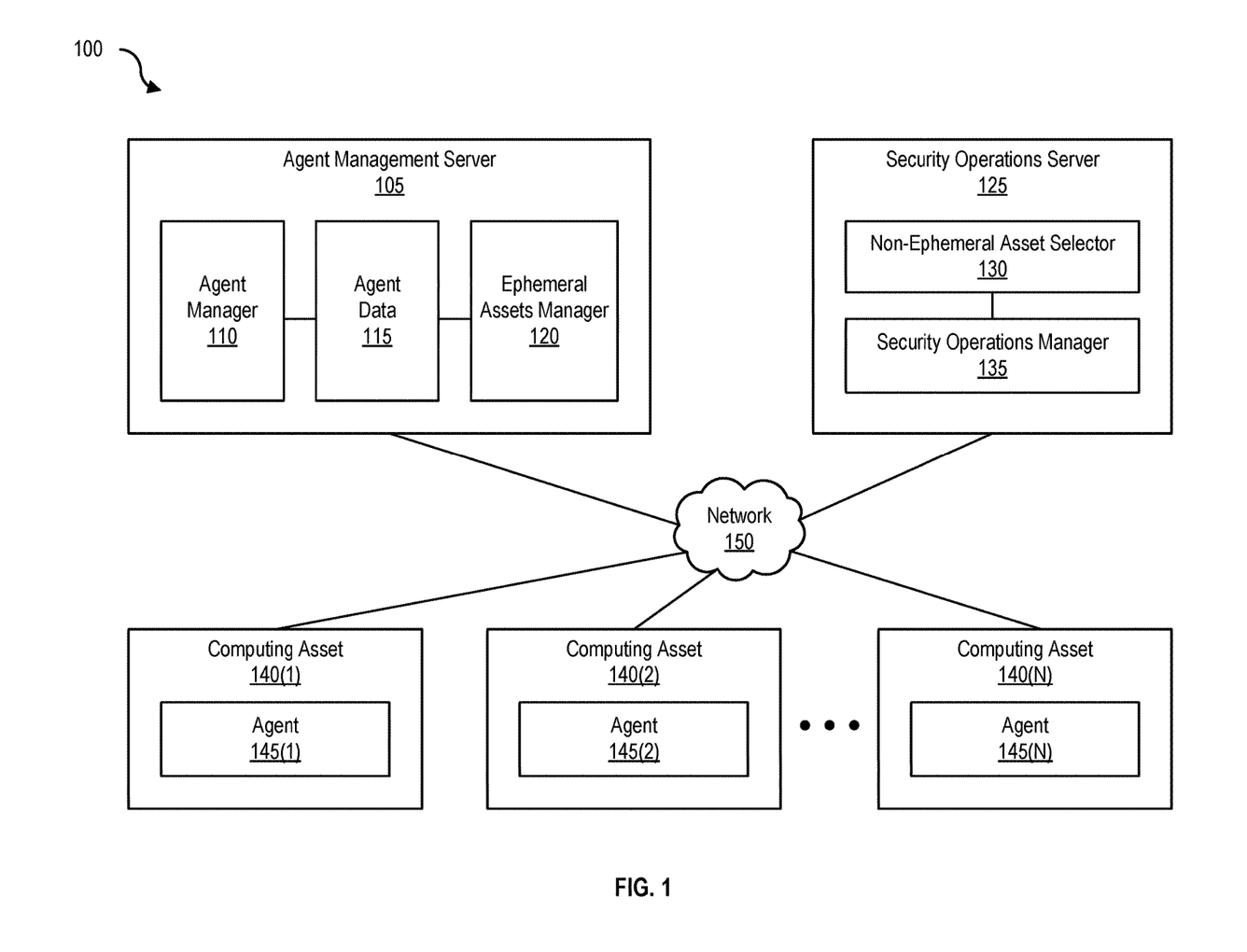
FIG. 1 is a block diagram 100 of an agent management server for identifying ephemeral computing assets, according to one embodiment of the present disclosure.

FIG. 1 is a block diagram 100 of an agent management server 105 for identifying ephemeral computing assets and excluding them from security operations, according to one embodiment. Agent management server 105 can be any type of computing device and includes at least an agent manager 110, agent data 115, and an ephemeral assets manager 120. Agent management server 105 is communicatively coupled to a security operations server 125 and computing assets 140(1)-(N) via a network 150, which can be any type of network or interconnection. Security operations server 125, which can be any type of computing device, includes at least a non-ephemeral asset selector 130 and a security operations manager 135. Computing assets 140(1)-(N), which can be any type of physical or virtual computing assets (e.g., virtual machines), each include at least an agent (e.g., agents 145(1)-(N), respectively).

Agent manager 110 manages agents 145(1)-(N) that execute on computing assets 140(1)-(N). Agents 145(1)-(N) each communicate the identity and other information and metadata about computing assets 140(1)-(N) respectively, to agent manager 110 (e.g., agent data 115 such as hostname, Media Access Control (MAC) address, location information, and the like). In one embodiment, Ephemeral assets manager 120 identifies one or more computing assets 140(1)-(N) that are short lived or ephemeral (e.g., based on predictive methodologies and machine learning (ML) models that generate inferences based on multiple data points). In another embodiment, non-ephemeral asset selector 130 selects only non-ephemeral assets for security operations (e.g., vulnerability management, and the like) (to be performed) by security operations manager 135 (e.g., by pruning, excluding, or omitting one or more ephemeral assets that are part of computing assets 140(1)-(N) identified by ephemeral assets manager 120).

In certain embodiments, ephemeral assets manager 120 implements a ML model that accesses asset information (e.g., agent data 115 such as hostname, MAC address, Internet Protocol (IP) address, location information, and the like) and predicts (e.g., using logistic regression), to a degree of likelihood, whether (or not) a given computing asset is going to be short lived or ephemeral (e.g., in a given computing environment). Doing so using ML models removes human error from the decision making process. In addition, because the ML model implemented by ephemeral assets manager 120 is predictive, agent management server 105 does not need to wait for a given computing asset to turn off (or go offline). Instead, ephemeral assets manager 120 uses inference to determine whether the given computing asset is going to "probably" or "likely" exist temporarily (e.g., for a short period of time such that it can be safely excluded from redundant and wasteful subsequent security operations, continued monitoring, and the like).

Example Ephemeral Assets Manager to Identify Ephemeral Assets

Figure 2:
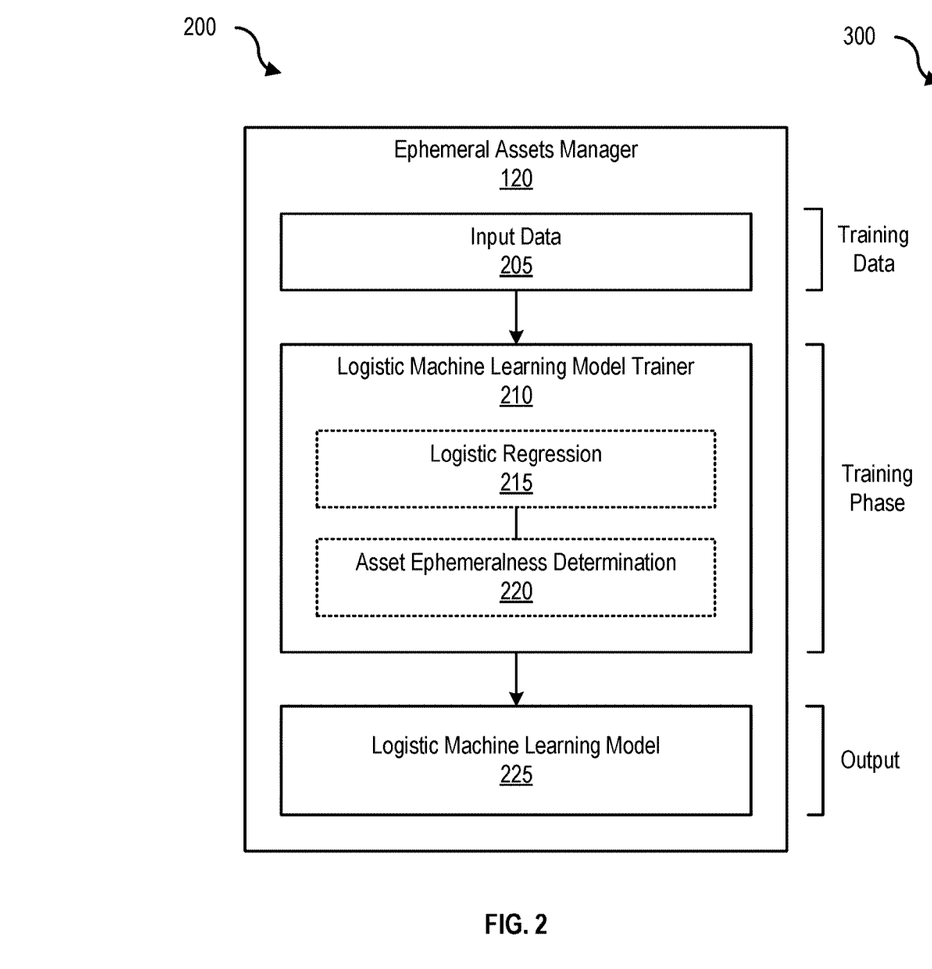
FIG. 2 is a block diagram 200 of an ephemeral assets manager, according to one embodiment of the present disclosure.

FIG. 2 is a block diagram 200 of ephemeral assets manager 120, according to one embodiment. Ephemeral assets manager 120 processes input data 205 and provides input data 205 to a logistic machine learning (ML) model trainer 210. Examples of input data 205 are provided with respect to FIG. 3, supra. Logistic ML model trainer 210 uses logistic regression 215 (e.g., a statistical model that uses a logistic function to model a binary dependent variable to determine the probability of a certain class or event existing) to make an asset ephemeralness determination 220 (e.g., in the instance case, to determine whether a computing asset of computing assets 140(1)-(N) is 'ephemeral' or 'not ephemeral').

Therefore, ephemeral assets manager 120 receives data associated with computing assets 140(1)-(N) in network 150 and provides the data as input data 205 to logistic machine learning (ML) model 225. Logistic ML model 225, as shown in FIG. 2, is trained to classify each computing asset 140(1)-(N) as ephemeral or non-ephemeral based on one or more feature characteristics of (each of) computing assets 140(1)-(N) by logistic ML model trainer 210. Ephemeral assets manager 120 then stores the (trained) logistic ML model (e.g., shown as logistic ML model 225 in FIG. 2). From a ML perspective, input data 205 is 'training data', logistic ML model trainer 210 is the 'training phase', and logistic ML model 225 is the 'output' (e.g., the (likelihood of) ephemeralness determination).

Figure 3:
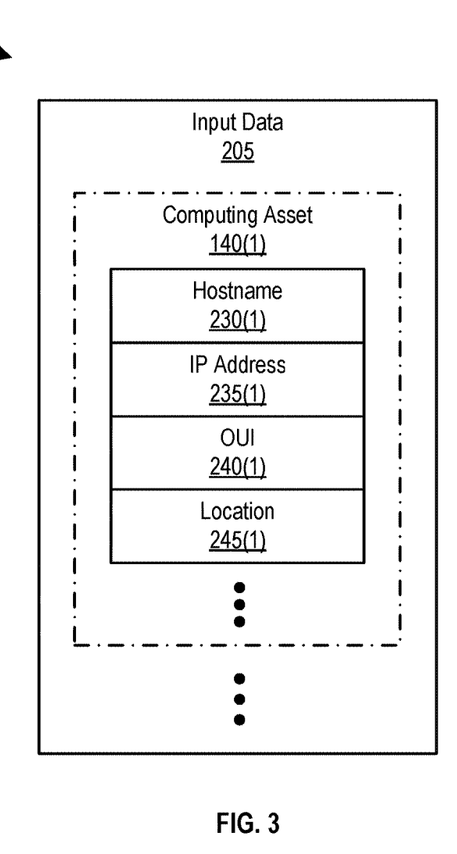
FIG. 3 is a block diagram 300 of example input data, according to one embodiment of the present disclosure.

FIG. 3 is a block diagram 300 of example input data 205, according to one embodiment. In certain embodiments, input data 205 associated with computing asset 140(1) can include a hostname 230(1), an IP address 235(1), an Organizationally Unique Identifier (OUI) 240(1) (e.g., a 24-bit number that uniquely identifies a vendor or manufacturer and is the first three octets of a MAC address) instead of a MAC address, and a location 245(1)). In this example, ephemeral assets manager 120 keeps only the first three octets of a MAC address associated with computing asset 140(1) and prunes the rest of the MAC address because the rest of the MAC address data is too specific to a particular asset's Network Interface Controller (NIC). On the contrary, OUI 240(1) provides a more general/generic NIC 'type' that can be used to identify other similar types, thus resulting in significant advantages in terms of the confidence associated with the "ephemeralness" output generated by logistic ML model 225. In some embodiments, OUI 240(1) is hashed to a numeric representation that can be used by logistic ML model 225. For example, the first word of an operating system (OS) description (as determined by a cybersecurity system's fingerprinting methods) can be hashed to a number that permits logistic ML learning model 225 to distinguish between different operating systems.

In one embodiment, the trained logistic ML model 225 is configured to determine whether a new computing asset in network 150 that is not part of computing assets 140(1)-(N) (e.g., computing asset 140(N+1)) is ephemeral and generate an ephemeralness confidence score for the new computing asset. For example, logistic ML model trainer 210 or logistic ML model 225 can utilize logistic regression 215 as a binary classification methodology for subsequent or continued training (e.g., based on updated input data necessitated by the new computing asset). In another embodiment, new computing asset 140(N+1) is excluded from security operations by agent manager 110 that manages agent 145(N+1) executing on new computing asset 140(N+1). In this example, security operations can include a vulnerability assessment operation, a vulnerability management operation, a vulnerability validation operation, or a penetration testing operation. In certain embodiments, ephemeral assets manager 120 determines whether new computing asset 140(N+1) is subject to a security operation that is charged based on a 'price per asset scanned' model (e.g., by a security vendor). If new computing asset 140(N+1) is subject to the security operation that is charged based on a price per asset scanned model and new computing asset 140(N+1) is designated as 'ephemeral' by logistic ML model, new computing asset 140(N+1) is excluded from the security operation by security operations manager 135.

Example of Excluding Ephemeral Assets from Security Operations

In one embodiment, a predictive methodology (e.g., logistic regression) is used to identify 'ephemeralness' of a computing asset. The identification is inferred from multiple data points instead of being programmatically determined ahead of time. Therefore, a confidence score (discussed with respect to FIG. 4, supra) can be provided by ephemeral assets manager 120. In addition, because logistic ML model 225 is a machine learning model, logistic ML model 225 can be trained (e.g., by logistic ML model trainer 210) over time to improve accuracy (and confidence) as more relevant information and data on ephemeralness is collected (e.g., new input data 205, updates to input data 205, and the like). Therefore, available data regarding a computing asset can be used to infer an 'ephemeralness' determination without waiting for one or more events that would otherwise (be needed to) confirm the 'ephemeralness' (e.g., a given virtual machine going offline or leaving the network several times after 3 minutes).

In certain embodiments, logistic ML model 225 is trained by the logistic ML model trainer 210 on data (e.g., input data 205 formulated from agent data 115) that is collected by various agents (e.g. agents 145(1)-(N) executing on computing assets 140(1)-(N)). In this example, the data is pulled (or collected) from a data collection Application Programming Interface (API) (e.g., provided by agent management server 105) and stored in a cloud storage resource (e.g., a cloud-based object storage resource) for retrieval. The data is then loaded from the cloud-based object storage resource and fed into logistic ML model trainer 210 (e.g., as input data 205 using a training API that is associated with the particular cloud-based object storage resource). As noted, in some embodiments, logistic ML model trainer 210 is a binary classifier that classifies a given computing asset as 'ephemeral' or 'non-ephemeral'.

In one embodiment, logistic ML learning model 225 has an endpoint in front of it for querying purposes (e.g., security operations server 125). In this example, either test data from an original dataset (e.g., input data 205) or new data can be provided to the endpoint to query logistic ML learning model 225 whether previously unseen assets (e.g., new computing asset 140(N+1)) are ephemeral or not (e.g., in the same format as input data 205 as shown in FIG. 3). Each data point is cleaned, transformed, and treated individually (e.g., MAC addresses being pruned to only include OUIs to optimize the performance of logistic ML learning model 225 as discussed).

In some embodiments, the result (e.g., the output) includes the binary outcome with a corresponding confidence factor—thus permitting the safe (and confident) exclusion of ephemeral computing assets from expensive security operations that can prove wasteful or redundant, reducing the amount of data stored (e.g., in expensive cloud-based object storage), and improving the signal to noise ratio in analytics and/or discovery in distributed data collection environments (e.g., with respect incident detection and response (IDR), among other examples).

Example Security Operation Asset Selection Table

Figure 4:
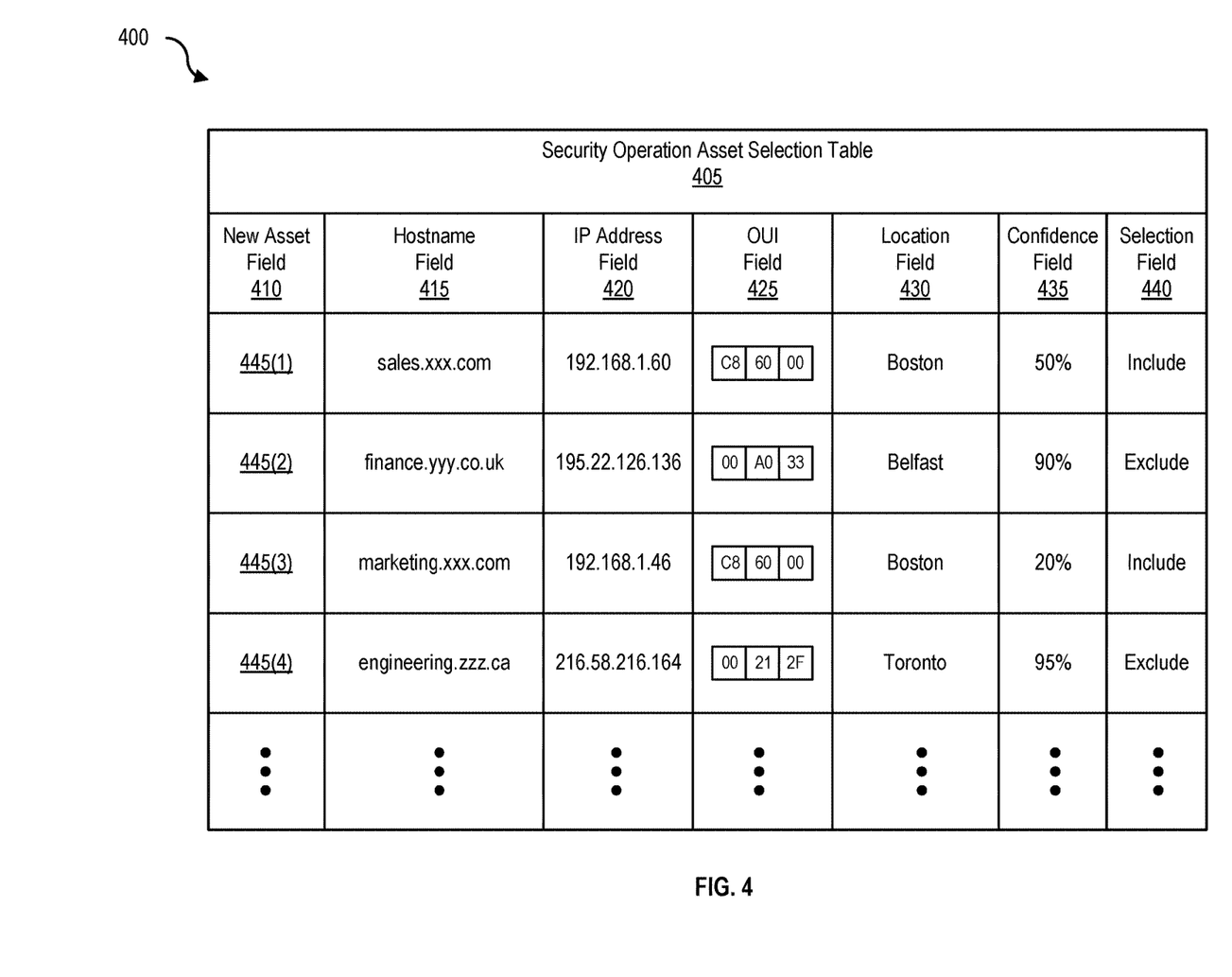
FIG. 4 is a table 400 for selecting assets for security operations, according to one embodiment of the present disclosure.

FIG. 4 is a table 400 for selecting assets for security operations, according to one embodiment. Security operation asset selection table 405 includes at least a new asset field 410, a hostname field 415, an IP address field 420, an OUI field 425, a location field 430, a confidence field 435, and a selection field 440. As shown in FIG. 4, new computing assets 445(1)-(4) are processed using logistic ML model 225. The 'ephemeralness' output results are now discussed with respect to including or excluding computing assets from security operations.

In one embodiment, new computing asset 445(1) includes a hostname sales.xxx.com, an IP address 192.168.1.60, an OUI of C8-60-00, and a location of Boston. Logistic ML model 225 outputs a confidence score of 50% that new computing asset 445(1) is ephemeral. In this example, non-ephemeral asset selector 130 includes new computing asset 445(1) in one or more security operations to be performed by security operations manager 135.

In another embodiment, new computing asset 445(2) includes a hostname finance.yyy.co.uk, an IP address 195.22.126.136, an OUI of 00-A0-33, and a location of Belfast. Logistic ML model 225 outputs a confidence score of 90% that new computing asset 445(2) is ephemeral. In this example, non-ephemeral asset selector 130 excludes new computing asset 445(2) from one or more security operations to be performed by security operations manager 135.

In some embodiments, new computing asset 445(3) includes a hostname marketing.xxx.com, an IP address 192.168.1.46, an OUI of C8-60-00, and a location of Boston. Logistic ML model 225 outputs a confidence score of 20% that new computing asset 445(3) is ephemeral. In this example, non-ephemeral asset selector 130 includes new computing asset 445(3) in one or more security operations to be performed by security operations manager 135.

In other embodiments, new computing asset 445(4) includes a hostname engineering.zzz.ca, an IP address 216.58.216.164, an OUI of 00-21-2F, and a location of Toronto. Logistic ML model 225 outputs a confidence score of 95% that new computing asset 445(4) is ephemeral. In this example, non-ephemeral asset selector 130 excludes new computing asset 445(4) from one or more security operations to be performed by security operations manager 135.

In certain embodiments, ephemeral assets manager 120 determines whether a new computing asset (e.g., one or more of computing assets 445(1)-(N)) is scheduled or designated for a security operation (e.g., a vulnerability monitoring operation, and the like) to be performed by security operations server 125 that is subject to a 'price per asset' for discovery, scanning, or any further subsequent or continued monitoring or analysis. If logical ML model 225 determines that the new computing asset is ephemeral and ephemeral assets manager 120 makes a further determination that the new computing asset is subject to a 'price per asset' for continued monitoring, scanning, or analysis (e.g., based on information received from security operations manager 135), ephemeral assets manager 120 executing on agent management server 105 instructs non-ephemeral asset selector 130 executing on security operations server 125 to exclude the new computing asset from further monitoring, discovery, scanning, or analysis (in addition to excluding the new computing asset from any subsequently or continually scheduled security operations such as vulnerability management, vulnerability validation, penetration testing, incident detection and response, application scanning, and the like).

In some embodiments, if the OUI of the new computing asset is the same as one or more OUIs of one or more computing assets 140(1)-(N) (e.g., existing computing assets used to train logistic ML model 225 using logistic ML model trainer 210 as shown in FIG. 2) and the new computing asset and the one or more (existing) computing assets are in the same location (or indicate common ownership by the same user in some other manner), non-ephemeral asset selector 130 includes the new computing asset in subsequent and/or continued security operations to be performed by security operations manager 135 even if the logistic ML model 225 outputs a binary result and a confidence score, that in totality, indicate that the new computing asset is ephemeral. In other embodiments, once a new computing asset has been determined to be and is designated as ephemeral, the data associated with the new computing asset (e.g., agent-collected data) is deleted from cloud-based object storage.

Figure 5:
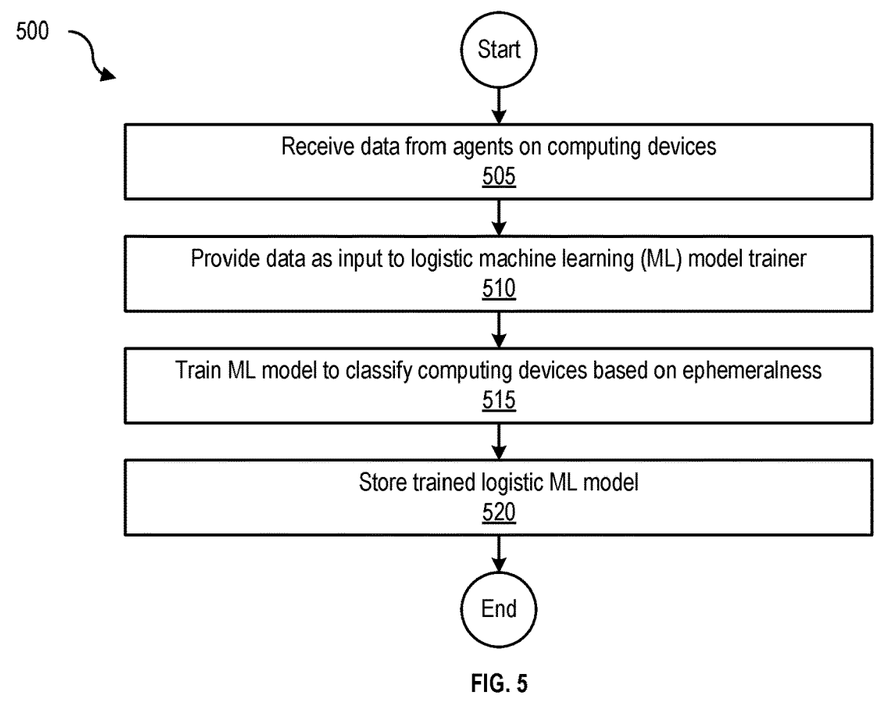
FIG. 5 is a flowchart 500 of a process to generate a trained logistic machine learning model, according to one embodiment of the present disclosure.

Example Processes to Identify and Exclude Ephemeral Assets from Security Operations FIG. 5 is a flowchart 500 of a process to generate a trained logistic machine learning model, according to one embodiment. The process begins at 505 by receiving data from agents on computing devices (e.g., agents 145(1)-(N) on computing assets 140(1)-(N) as shown in FIG. 1). In this example, the data received from agents is processed by agent manager 110 and stored as agent data 115 (e.g., in a cloud-based object storage device, resource, or service). At 510, the process provides the data as input to logistic ML model 210 (e.g., as input data 205 with at least a hostname, an IP address, a OUI pruned from a MAC address, a location, and the like, as shown in FIG. 2). At 515, the process trains logistic ML model 210 to classify computing devices based on ephemeralness (e.g., making asset ephemeralness determination 220 based on logistic regression 215, which is further based on individual data points in input data 205 as shown in FIG. 2, among other classification-based ML methodologies). The process ends at 520 by storing the trained logistic ML model (e.g., as logistic ML model 225 as shown in FIG. 2).

Figure 6:
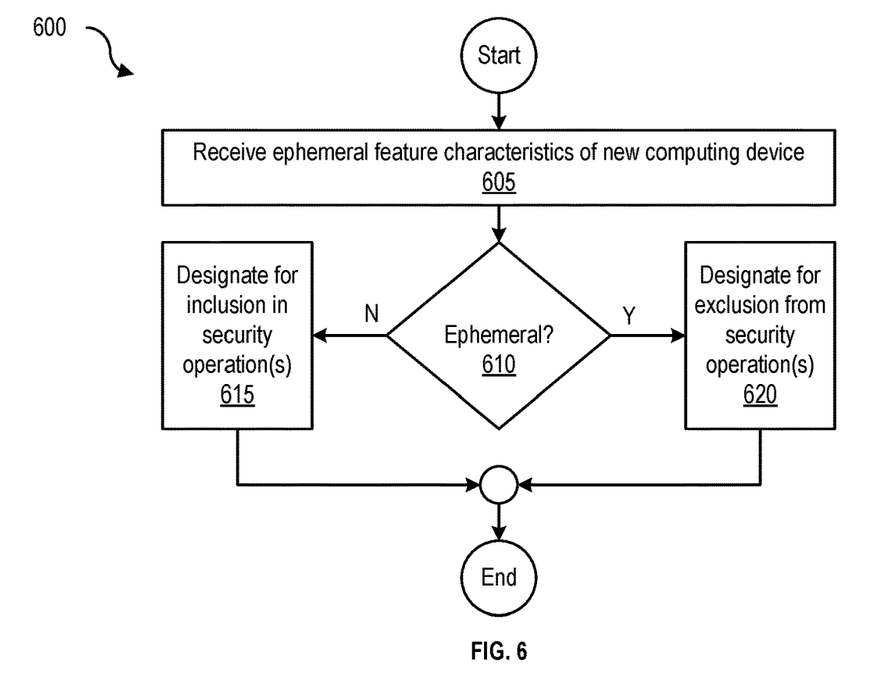
FIG. 6 is a flowchart 600 of a process to identify ephemeral computing assets, according to one embodiment of the present disclosure.

FIG. 6 is a flowchart 600 of a process to identify ephemeral computing assets, according to one embodiment. The process begins at 605 by receiving ephemeral feature characteristics of a new computing device (e.g., new computing asset 445(1)). For example, ephemeral feature characteristics can include data points required for ephemeralness determination of the new computing device that are the same, similar, or substantially similar to one or more data points that are part of input data 205 used to (previously) train logistic ML model trainer 210 (as shown in FIG. 2). At 610, the process determines whether the new computing device is ephemeral (e.g., using (trained) logistic ML model 225). In some embodiments, in addition to a binary yes/no ephemeralness determination, ephemeral assets manager 120 assigns a ephemeralness confidence score to the binary result/output generated by logistic ML model 225.

At 615, if logistic ML Model 225 determines that the new computing device is ephemeral and, in addition, if ephemeral assets manager 120 determines that the ephemeralness exceeds a pre-determined ephemeralness threshold, agent management server 105 instructs security operations server 125 to designate the new computing device for inclusion in one or more security operations, procedures, or processes to be performed or scheduled to be performed by security operations manager 135.

However, if logistic ML model 225 determines that the new computing device is not ephemeral or if ephemeral assets manager 120 determines that the ephemeralness does not exceed a pre-determined ephemeralness threshold (even if logistic ML model 225 determines that the new computing device is indeed ephemeral), agent management server 105 instructs security operations server 125 to designate the new computing device for exclusion from one or more security operations, procedures, or processes to be performed or scheduled to be performed by security operations manager 135. The process ends after the inclusion or exclusion steps (e.g., unless there is another new computing device or if updated input data is received from and/or is accessible from agent manager 110).

Figure 7:
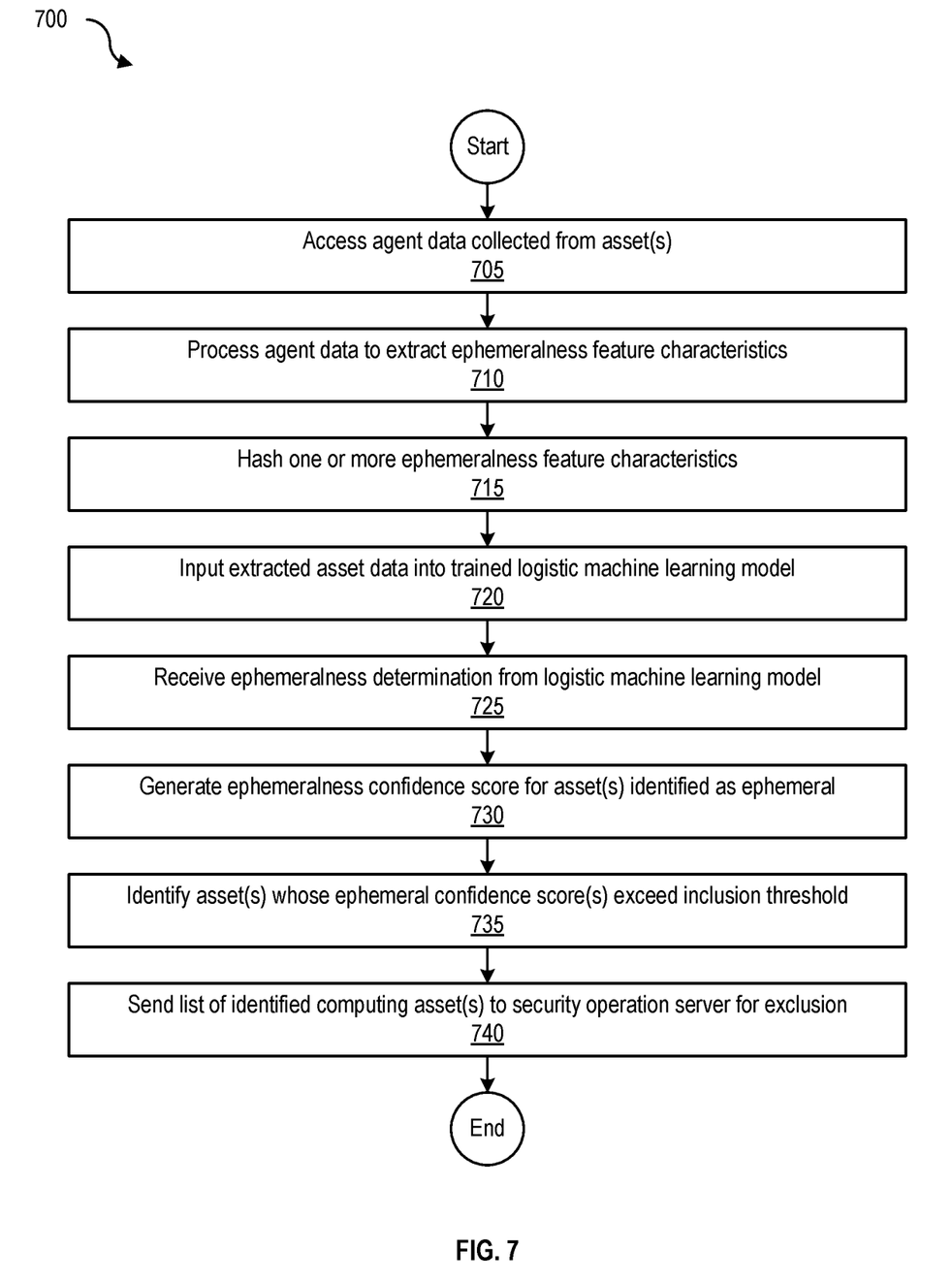
FIG. 7 is a flowchart 700 of a process to inhibit ephemeral computing assets from security operations, according to one embodiment of the present disclosure.

FIG. 7 is a flowchart 700 of a process to inhibit ephemeral computing assets from security operations, according to one embodiment. The process begins at 705 by accessing agent data (e.g., agent data 115) collected from assets (e.g., computing assets 140(1)-(N)), and at 710, processes agent data to extract ephemeralness feature characteristics. At 715, the process hashes one or more ephemeralness feature characteristics (e.g., IP address, hostname, OUI or MAC address, location, among others), and at 720, inputs the extracted asset data into a trained logistic ML model (e.g., as input data 205(n) into logistic ML model 225).

At 725, the process receives an ephemeralness determination (e.g., a binary yes or no) from logistic ML model 225, and at 730, generates an ephemeralness confidence score for assets identified as ephemeral (e.g., using several iterations of security operation asset selection table 405 retrieved from memory of security operations server 125 that can include historic input data, current input data, and the individual data points contributing to changes in the ephemeralness determination and/or the ephemeralness confidence score).

At 735, the process identifies assets whose ephemeral confidence scores exceed an inclusion threshold (e.g., an inclusion threshold applicable to similar assets previously analyzed for ephemeralness and indicated in security operation asset selection table 405), and ends at 740 by sending a list of identified computing assets to non-ephemeral asset selector 130 security operations server 125 for exclusion (e.g., from security operations, procedures, and/or processes to be performed or scheduled to be performed by security operations manager 135). In this manner, the processes disclosed herein identify and exclude ephemeral assets from security operations.

Example Computing Environment

Figure 8:
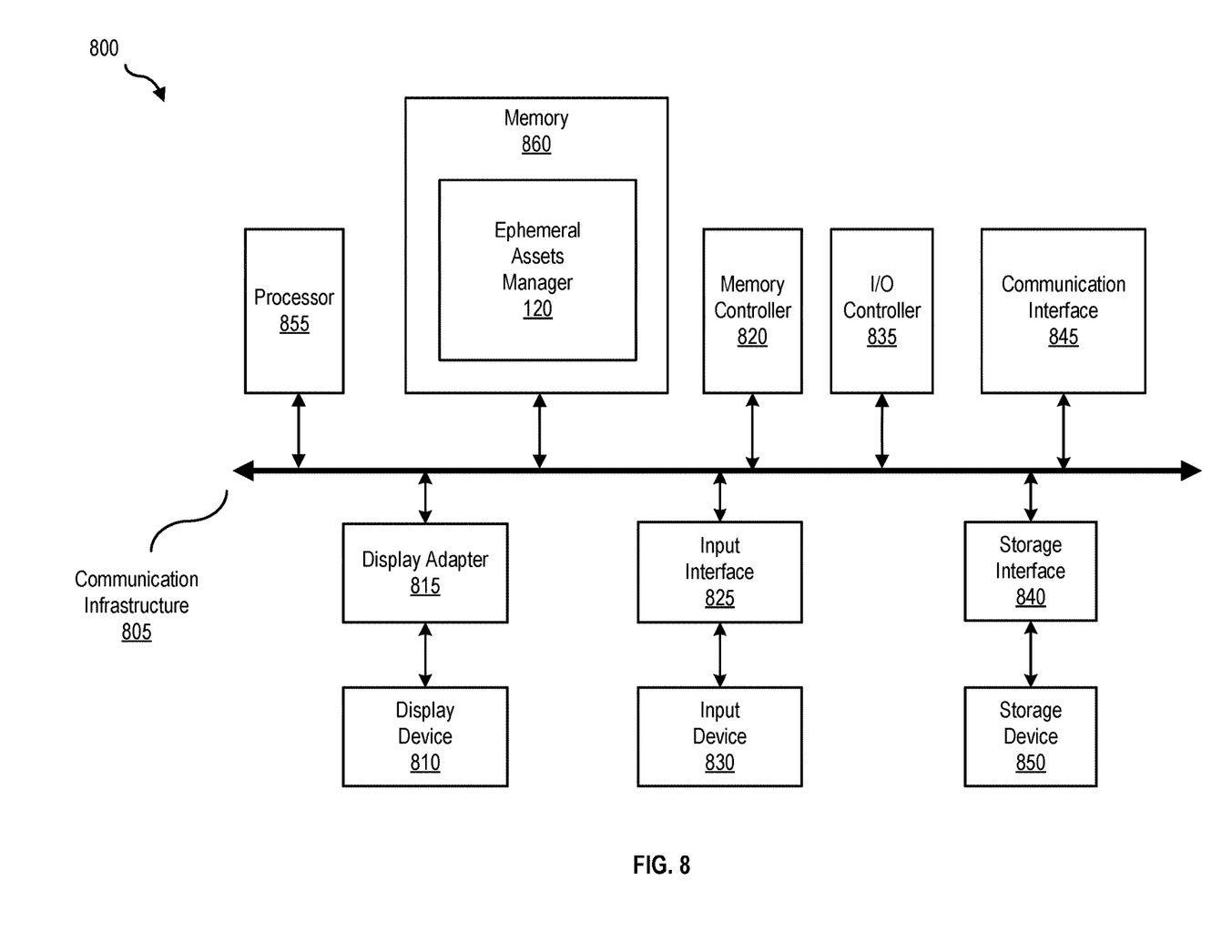
FIG. 8 is a block diagram 800 of a computing system, illustrating an extraction engine and a web application security engine, according to one embodiment of the present disclosure.

FIG. 8 is a block diagram 800 of a computing system, illustrating how an ephemeral assets manager can be implemented in software, according to one embodiment. Computing system 800 can include agent management server 105 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes ephemeral assets manager 120, computing system 800 becomes a special purpose computing device that is configured to identify and exclude ephemeral assets from wasteful and expensive security operations based on ML methodologies applied to ML characteristics.

Processor 855 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing ephemeral assets manager 120 (and associated ML model trainers and resultant trained ML models) may be loaded into memory 860 (from which tables, findings, determinations, identifications, indications, and results may be accessible by or transmitted to security operations server 125, for example, for inclusion and exclusion purposes).

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware, or via a machine learning model (e.g., to identify and exclude wasteful ephemeral computing devices from expensive security operations and to delete agent-collected data about the ephemeral computing devices from resource intensive storage).

Example Networking Environment

Figure 9:
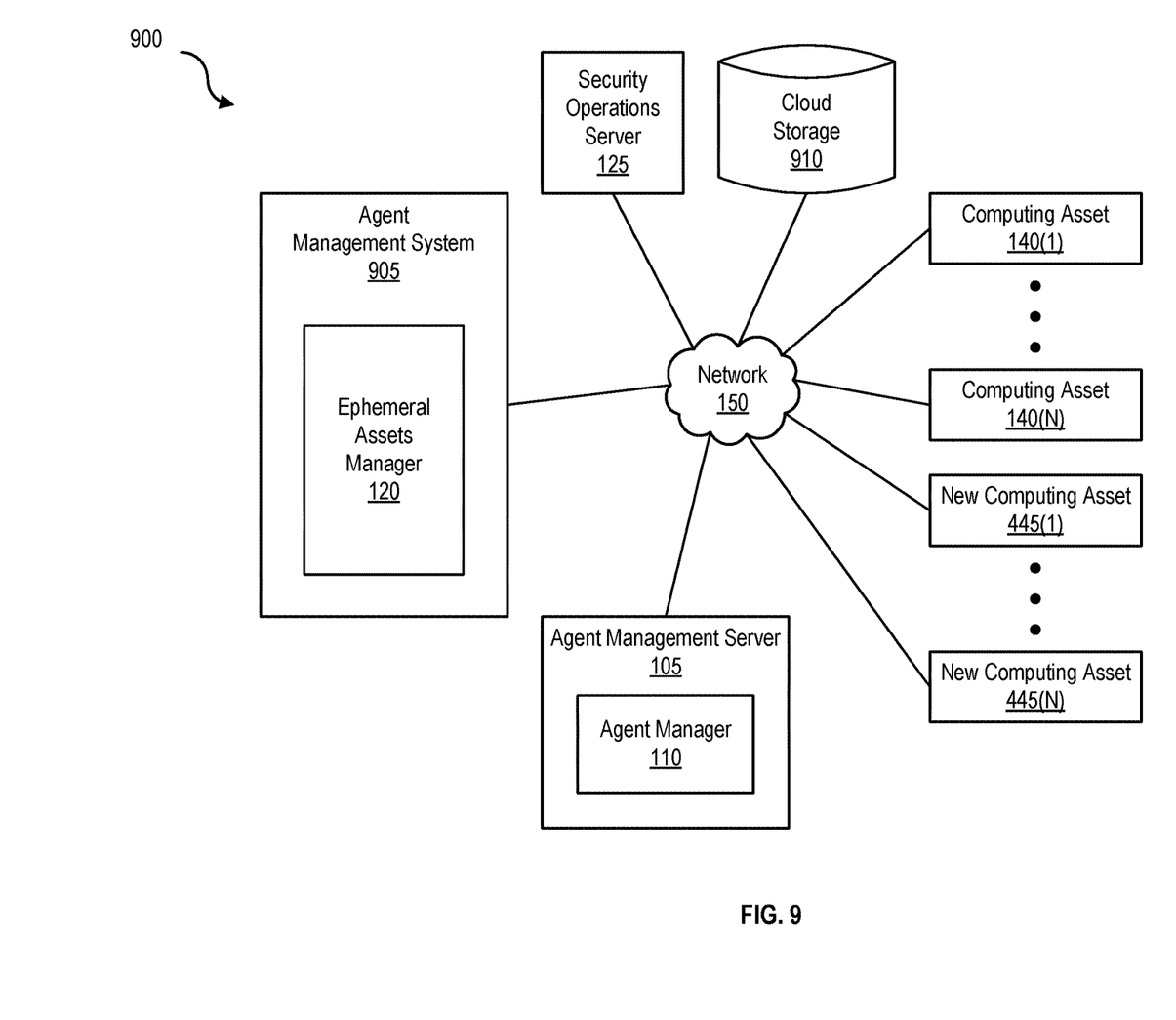
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 150 generally represents any type or form of computer network or architecture capable of facilitating communication between agent management server 105, security operations server 125, and/or computing assets 140(1)-(N) (including any new computing assets 445(1)-(N)). For example, network 150 can be a Wide Area Network (WAN) (e.g., the Internet), a Storage Area Network (SAN), or a Local Area Network (LAN).

Ephemeral assets manager 120 may be part of agent management server 105, or may be separate (as shown in FIG. 9). All or a portion of embodiments may be encoded as a computer program and loaded onto, stored, and/or executed by ephemeral assets manager 120, and distributed over network 150.

In some examples, all or a portion of agent management system 905, agent management server 105, and/or security operations server 125 may represent portions of a cloud-computing or network-based environment. These cloud-based services (e.g., software as a service, platform as a service, storage as a service, cloud storage platforms or resources, cloud-based object storage, infrastructure as a service, etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, ephemeral assets manager 120 may transform the behavior of agent management system 905 or agent management server 105 to identify ephemeral computing assets using machine learning.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
   receiving data comprising an organizational unique identifier (OUI) of a Media Access Control (MAC) address associated with each of a plurality of computing assets in a network;
   providing the data comprising the OUI of each of the plurality of computing assets hashed to a numeric representation as an input to a logistic machine learning model trainer;
   wherein the data provided as the input to the logistic machine learning model trainer comprises only the organizational unique identifier (OUI) of the MAC address instead of the MAC address for each of the plurality of computing assets, and the OUI comprises first three octets of the MAC address;
   training a logistic machine learning model to classify each of the plurality of computing assets as ephemeral or non-ephemeral based on one or more feature characteristics of each of the plurality of computing assets;

wherein the trained logistic machine learning model is configured to:

determine whether a new computing asset in the network that is not part of the plurality of computing assets is ephemeral;

generate an ephemeralness confidence score for the new computing asset;

wherein the one or more feature characteristics comprise at least a hostname, an Internet Protocol (IP) address, a Media Access Control (MAC) address, and location information of each of the plurality of computing assets; and storing the trained logistic machine learning model.

2. The computer-implemented method of claim 1, wherein the plurality of computing assets comprise one or more physical computing assets and one or more virtual computing assets, the plurality of computing assets execute in one or more networks, and the data is collected by an agent executing on each of the plurality of computing assets.

3. The computer-implemented method of claim 2, wherein the new computing asset is excluded from one or more security operations by an agent manager that manages the agent executing on each of the plurality of computing assets, and the one or more security operations comprise at least
 a vulnerability assessment operation,
 a vulnerability management operation,
 a vulnerability validation operation, or
 a penetration testing operation.

4. The computer-implemented method of claim 1, wherein the logistic machine learning model trainer utilizes logistic regression as a binary classification methodology for the training.

5. A system comprising:

one or more processors; and a memory coupled to the one or more processors, wherein the memory stores program instructions executable by the one or more processors to:

receive data comprising an organizational unique identifier (OUI) of a Media Access Control (MAC) address associated with each of a plurality of computing assets in a network;

provide the data comprising the OUI of each of the plurality of computing assets hashed to a numeric representation as an input to a logistic machine learning model trainer;

wherein the data provided as the input to the logistic machine learning model trainer comprises only the organizational unique identifier (OUI) of the MAC address instead of the MAC address for each of the plurality of computing assets, and the OUI comprises first three octets of the MAC address, train a logistic machine learning model to classify each of the plurality of computing assets as ephemeral or non-ephemeral based on one or more feature characteristics of each of the plurality of computing assets;

wherein the trained logistic machine learning model is configured to:

determine whether a new computing asset in the network that is not part of the plurality of computing assets is ephemeral, and generate an ephemeralness confidence score for the new computing asset, wherein the one or more feature characteristics comprise at least a hostname, an Internet Protocol (IP) address, a Media Access Control (MAC) address, and location information of each of the plurality of computing assets; and store the trained logistic machine learning model.

6. The system of claim 5, wherein the plurality of computing assets comprise one or more physical computing assets and one or more virtual computing assets, the plurality of computing assets execute in one or more networks, and the data is collected by an agent executing on each of the plurality of computing assets.

7. The system of claim 6, wherein the new computing asset is excluded from one or more security operations by an agent manager that manages the agent executing on each of the plurality of computing assets, and the one or more security operations comprise at least a vulnerability assessment operation, a vulnerability management operation, a vulnerability validation operation, or a penetration testing operation.

8. The system of claim 5, wherein the logistic machine learning model trainer utilizes logistic regression as a binary classification methodology for the training.

* * * * *